(12) United States Patent
Jasper et al.

(10) Patent No.: US 11,845,605 B2
(45) Date of Patent: *Dec. 19, 2023

(54) VALVE ARRANGEMENT AND DISPENSING APPARATUS

(71) Applicant: APTAR DORTMUND GMBH, Dortmund (DE)

(72) Inventors: Bernhard Jasper, Waltrop (DE); Detlef Schmitz, Luenen (DE); Lukas Kurosky, Dortmund (DE)

(73) Assignee: APTAR DORTMUND GMBH, Dortmund (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,446

(22) Filed: Apr. 7, 2022

(65) Prior Publication Data

US 2022/0227570 A1 Jul. 21, 2022

Related U.S. Application Data

(63) Continuation of application No. 16/978,363, filed as application No. PCT/EP2019/052281 on Jan. 30, 2019, now Pat. No. 11,299,338.

(30) Foreign Application Priority Data

Mar. 16, 2018 (DE) .................... 10 2018 002 130.1
May 4, 2018 (DE) .................... 10 2018 003 741.0

(51) Int. Cl.
*B65D 83/48* (2006.01)
*B29C 65/08* (2006.01)
(Continued)

(52) U.S. Cl.
CPC .............. *B65D 83/48* (2013.01); *B29C 65/08* (2013.01); *B29C 66/71* (2013.01);
(Continued)

(58) Field of Classification Search
CPC ........ B65D 83/48; B65D 53/02; B65D 83/38; B29C 65/08; B29C 66/71; B29C 66/112;
(Continued)

(56) References Cited

U.S. PATENT DOCUMENTS 4,919,312 A 4/1990 Beard et al.
4,969,577 A 11/1990 Werding
(Continued)

FOREIGN PATENT DOCUMENTS

EP 2832661 A1 2/2015
EP 2894114 A1 7/2015
(Continued)

OTHER PUBLICATIONS

International Search Report for International Application No. PCT/EP2019/052281, dated May 27, 2019.
(Continued)

*Primary Examiner* — Vishal Pancholi
(74) *Attorney, Agent, or Firm* — Jason H. Vick; Sheridan Ross, PC

(57) ABSTRACT

A valve arrangement for dispensing a fluid is proposed. The valve arrangement comprises a valve plate for fixing the valve arrangement to a container, a valve housing and a fixing part for fixing the valve housing to the valve plate. The fixing part is welded with the valve plate. Furthermore, a dispensing apparatus with a container and a valve arrangement as well as a production method are proposed.

28 Claims, 11 Drawing Sheets

(51) Int. Cl.
    *B29C 65/00* (2006.01)
    *B29L 31/00* (2006.01)
    *B65D 53/02* (2006.01)
    *B65D 83/38* (2006.01)

(52) U.S. Cl.
    CPC ............ *B29L 2031/7158* (2013.01); *B29L 2031/7506* (2013.01); *B65D 53/02* (2013.01); *B65D 83/38* (2013.01)

(58) Field of Classification Search
    CPC ............ B29C 66/114; B29C 66/73921; B29C 65/069; B29C 66/7392; B29C 66/742; B29C 65/1635; B29C 66/542; B29C 66/5344; B29C 65/0672; B29L 2031/7158; B29L 2031/7506; B23K 20/10
    See application file for complete search history.

(56) References Cited

U.S. PATENT DOCUMENTS

| | | |
|---|---|---|
| 5,573,043 A | 11/1996 | Fuehrer |
| 9,573,750 B2 | 2/2017 | Seling et al. |
| 9,598,227 B2 | 3/2017 | Franz et al. |
| 11,299,338 B2 | 4/2022 | Jasper et al. |
| 2005/0121476 A1 | 6/2005 | Pauls et al. |
| 2012/0292338 A1 | 11/2012 | Smith |
| 2015/0034682 A1 | 2/2015 | Seling et al. |
| 2015/0197392 A1 | 7/2015 | Franz et al. |
| 2018/0134481 A1 | 5/2018 | Bodet et al. |
| 2018/0222647 A1 | 8/2018 | Geier et al. |

FOREIGN PATENT DOCUMENTS

| | | |
|---|---|---|
| EP | 2894114 B1 | 2/2019 |
| JP | S 63-502267 A | 9/1988 |
| JP | H 02-500572 A | 3/1990 |
| JP | 2003-522269 A | 7/2003 |
| JP | 2007-039115 A | 2/2007 |
| WO | WO 89/08062 | 9/1989 |
| WO | WO 01/58997 A1 | 8/2001 |
| WO | WO 03/062092 A1 | 7/2003 |
| WO | WO 2016/202754 A1 | 12/2016 |
| WO | WO 2017/021038 A1 | 2/2017 |

OTHER PUBLICATIONS

Written Opinion for International Application No. PCT/EP2019/052281, dated May 27, 2019.
International Preliminary Report on Patentability for International Application No. PCT/EP2019/052281, dated Oct. 1, 2020.
Office Action for U.S. Appl. No. 16/978,363, dated Aug. 6, 2021.
Office Action for U.S. Appl. No. 16/978,363, dated Dec. 10, 2021.
Notice of Allowance for U.S. Appl. No. 16/978,363, dated Jan. 28, 2022.

VALVE ARRANGEMENT AND DISPENSING APPARATUS

CROSS-REFERENCE TO RELATED APPLICATIONS

This application is a continuation of U.S. Application Ser. No. 16/978,363, filed 4 Sep. 2020, now U.S. Patent Na 11,299,338, which is a national stage application under 35 U.S.C. 371 of PCT Application No. PCT/EP2019/052281 having an international filing date of 30 Jan. 2019 which designated the United States, which PCT application claimed the benefit of German Application No. 10 2018 002 130.1 filed 16 Mar. 2018 and German Application No. 10 2018 003 741.0 filed 4 May 2018, each of which are incorporated herein by reference in their entirety.

BACKGROUND

Field

The present invention relates to a valve arrangement for dispensing a fluid, a dispensing apparatus for dispensing a fluid, and a method for producing a dispensing apparatus. In particular, the present invention relates to the field of aerosol containers, thus containers in which a pressurized fluid is contained which can be dispensed and/or sprayed as an aerosol. Such containers can be used in particular for hygiene products, care products and cosmetic products, for example deodorants or hair sprays.

In principle, however, the present invention can be used in a versatile manner and can be used in any technical field in which a (metered) dispensing of a fluid from a container takes place.

Description of Related Art

WO 89/08062 A2 discloses an aerosol container whose opening is closed by a valve plate with a dispensing valve. The aerosol container consists of plastic. The valve plate and a housing of the dispensing valve are formed in one piece from plastic. A plastic cap is attached on the valve housing and welded with the outer opening edge of the valve housing.

EP 2 894 114 A1 discloses a valve assembly for aerosol containers with a valve plate, a valve element and a valve housing for the valve element. On the top side of the valve plate a cover is arranged which closes an assembly opening of the valve housing and is fixed to the valve plate, for example by a welded joint. The valve plate and the cover consist of plastic.

EP 2 832 661 A1 discloses an aerosol container whose container opening is closed by a valve plate with a dispensing valve, wherein the valve plate consists of plastic. At the inner side of the valve plate, a dimensionally stable extension is formed, which forms a receiving space for a valve housing of the dispensing valve. The extension and the valve housing are connected by at least one separate securing element.

WO 2016/202754 A1 relates to a valve arrangement for an aerosol container. A valve plate and a valve housing of the valve arrangement are formed by a one-piece component into which a spring, a seal and a valve element are inserted from the outer side facing away from the container and are fixed to the valve plate by a substantially disk-like retaining ring. The retaining ring is axially ultrasonically welded to the valve plate.

WO 2017/021038 A1 relates to a valve arrangement and a container for dispensing a fluid. A valve plate of the valve arrangement consists of semi-crystalline polyester. It can generally be joined to a container by friction welding, ultrasonic welding or laser welding, wherein a collar of the valve plate grips around an edge of the container.

SUMMARY

It is an object of the present invention to enable a flexible use of a conventional valve and/or a simple and cost-effective production of a valve arrangement and/or dispensing apparatus.

The above object is solved by a valve arrangement, a dispensing apparatus, or a method as disclosed herein.

In particular, by the present invention a particularly simple possibility is given to selectively apply and/or use a valve known per se and/or a conventional valve with different valve plates, which may selectively consist of plastic or metal, without the valve itself having to be adapted. This enables simple and cost-effective production and/or assembly. Furthermore, the flexibility is increased when producing a valve arrangement and/or dispensing apparatus, since different parts, in particular valve plates, can be used with the same standard valve.

A proposed valve arrangement is designed to dispense a fluid, in particular from a container. The valve arrangement has a valve plate for fixing the valve arrangement to an associated container. Further, the valve arrangement has a valve housing and a fixing part for fixing the valve housing to the valve plate. Preferably, the fixing part is a separate component from the valve housing. This allows the use of a standard valve with different valve plates.

Preferably, the fixing part is friction-welded and/or radially welded with the valve plate, wherein both are preferably made of plastic. This is conducive to flexible application, cost-effective production and secure and/or reliable fixing of the valve housing to the valve plate.

The fixing part is preferably ring-like or cap-like. This is conducive to simple and cost-effective production and/or assembly.

The fixing part preferably has a coupling portion for rotationally fixed coupling of the fixing part with a head during assembly. In particular, the coupling portion is designed in such a way that the fixing part can be held by the head for and/or during friction welding. This enables a simple and secure coupling of the fixing part with the head for and/or during friction welding.

Preferably, the coupling portion is arranged or formed on a cylindrical, in particular hollow cylindrical portion of the fixing part. This enables a simple and secure coupling of the fixing part with the head for and/or during friction welding.

The coupling portion is preferably arranged or formed on an end face and/or axial end of the fixing part and/or cylindrical portion. This is conducive to a simple and secure coupling between the fixing part and the head during assembly.

The coupling portion is preferably formed by or has one or more axially extending recesses or projections. This enables a secure coupling of the fixing part to the head in a simple manner.

The fixing part preferably has a welding region that is designed to be melted and/or plasticized during friction welding, so that a bonded connection and/or welded joint with the valve plate is created. In this way, a particularly secure and/or firm connection can be created in a simple manner.

The welding region and/or welded joint is preferably circumferential and/or ring-shaped. In particular, the welding region and/or the welded joint has an extension in the axial direction of at least 3 mm, preferably about 5 mm or more. This is conducive to secure and/or pressure-resistant fixing.

The fixing part can be arranged selectively on an inner side or on an outer side of the valve plate.

Preferably, the valve plate, the fixing part, the valve housing, a valve element of the valve arrangement and/or a spring of the valve arrangement and/or the valve arrangement as a whole consist of plastic, in particular PET. This enables a cost-effective production.

It is preferred that the valve housing can be connected in a form-fit manner with the valve element, the seal and optionally with the reset element to form a valve. In particular, the valve housing, the valve element, the seal and optionally the reset element are connectable and/or joinable together in such a way that they remain connected and/or do not fall apart during normal use and/or without external influence, so that the valve is insertable into the valve plate as a whole and/or as a pre-assembled component and is connectable to it. In particular, this makes assembly easier.

According to another aspect, which can also be realized independently, the fixing part is laser-welded or ultrasonically welded with the valve plate in the proposed valve arrangement. This is in particular provided as an alternative to a fixing part friction-welded with the valve plate.

In particular, the fixing part has a first cylindrical or conical portion and a second portion projecting radially therefrom. In this way, a contact surface between the valve plate and the fixing part can be formed which is easily accessible for a laser beam.

The fixing part preferably has a welding region. The welding region is arranged in particular on the second portion. Preferably, the welding region has a triangular or rectangular cross-section.

It is particularly preferred that the valve plate is made of a laser-absorbing and/or dark, in particular black, material and that the fixing part is made of a transparent, in particular laser-transparent, material. In this way, laser welding and/or ultrasonic welding of the fixing part with the valve plate is enabled in a simple manner.

According to another aspect, which can also be realized independently, the present invention relates to a dispensing apparatus for dispensing a fluid. The dispensing apparatus comprises a container and a valve arrangement with a valve plate fixed to the container.

Preferably, the valve plate is friction-welded and/or radially welded with the container.

According to a preferred aspect, the valve plate is axially flush with the container.

Alternatively or additionally, the valve arrangement, in particular the valve plate, and/or the container consists of plastic, in particular PET. This enables a cost-effective production.

The valve plate preferably has a coupling device which is designed for the rotationally fixed coupling of the valve plate with a tool and/or holder for friction welding the valve plate with the container. Preferably, the coupling device is formed by or has preferably radially extending coupling elements, in particular arranged on the upper side of the valve plate. The coupling elements are particularly preferably arranged in an in particular ring-like recess of the valve plate. This enables a reliable coupling in a simple way.

The container preferably has a coupling portion which is designed for rotationally fixed coupling with a tool and/or holder for and/or during friction welding of the valve plate with the container. The coupling portion is arranged in particular in or on a neck region of the container.

According to a preferred embodiment, the coupling portion has or is formed by one or more coupling elements projecting radially from the container. This enables a reliable coupling in a simple way.

According to a further aspect which can also be realized independently, the present invention relates to a method for the production of a valve arrangement for dispensing a fluid. Preferably, the valve arrangement has one or more of the features mentioned above and/or explained below. In the method, in particular the fixing part is friction-welded and/or radially welded with the valve plate.

According to a particularly preferred variant, the valve is inserted from an inner side of the valve plate into an assigned receptacle and/or opening of the valve plate, the fixing part is slid over the valve and arranged on the inner side of the valve plate and subsequently the fixing part is welded with the valve plate.

According to another variant, it is also possible that the valve is inserted from an outer side of the valve plate into an assigned receptacle and/or opening of the valve plate, the fixing part is slid over the valve and arranged on the outer side of the valve plate and subsequently the fixing part is welded with the valve plate.

According to a further aspect which can also be realized independently, the present invention relates to a method for the production of a valve arrangement, wherein the fixing part is laser-welded or ultrasonically welded with the valve plate. In particular, this is provided as an alternative to the method described above, in which the fixing part is friction-welded with the valve plate.

Particularly preferably, the valve is first inserted into an assigned receptacle of the valve plate and subsequently the fixing part is inserted or placed into the receptacle so that the valve is arranged between the valve plate and the fixing part, in particular clamped, and the fixing part lies against the valve plate. The valve plate is then preferably irradiated by a laser beam through the fixing part so that the valve plate and the fixing part are welded together.

According to a further aspect which can also be realized independently, the present invention relates to a method for the production of a dispensing apparatus, wherein the valve plate is friction-welded with the container so that the valve plate is radially welded to the container and/or is axially flush.

The aforementioned and subsequent aspects and features of the present invention may be combined with each other in any way, but may also be realized independently of each other.

Further aspects, features, advantages and properties of the present invention result from the claims and the following description of preferred embodiments with reference to the accompanying drawings.

DETAILED DESCRIPTION

In the figures, the same reference signs are used for identical or similar components and devices, wherein the same or corresponding advantages and characteristics may result, even if a repeated description is omitted.

Figure 1:
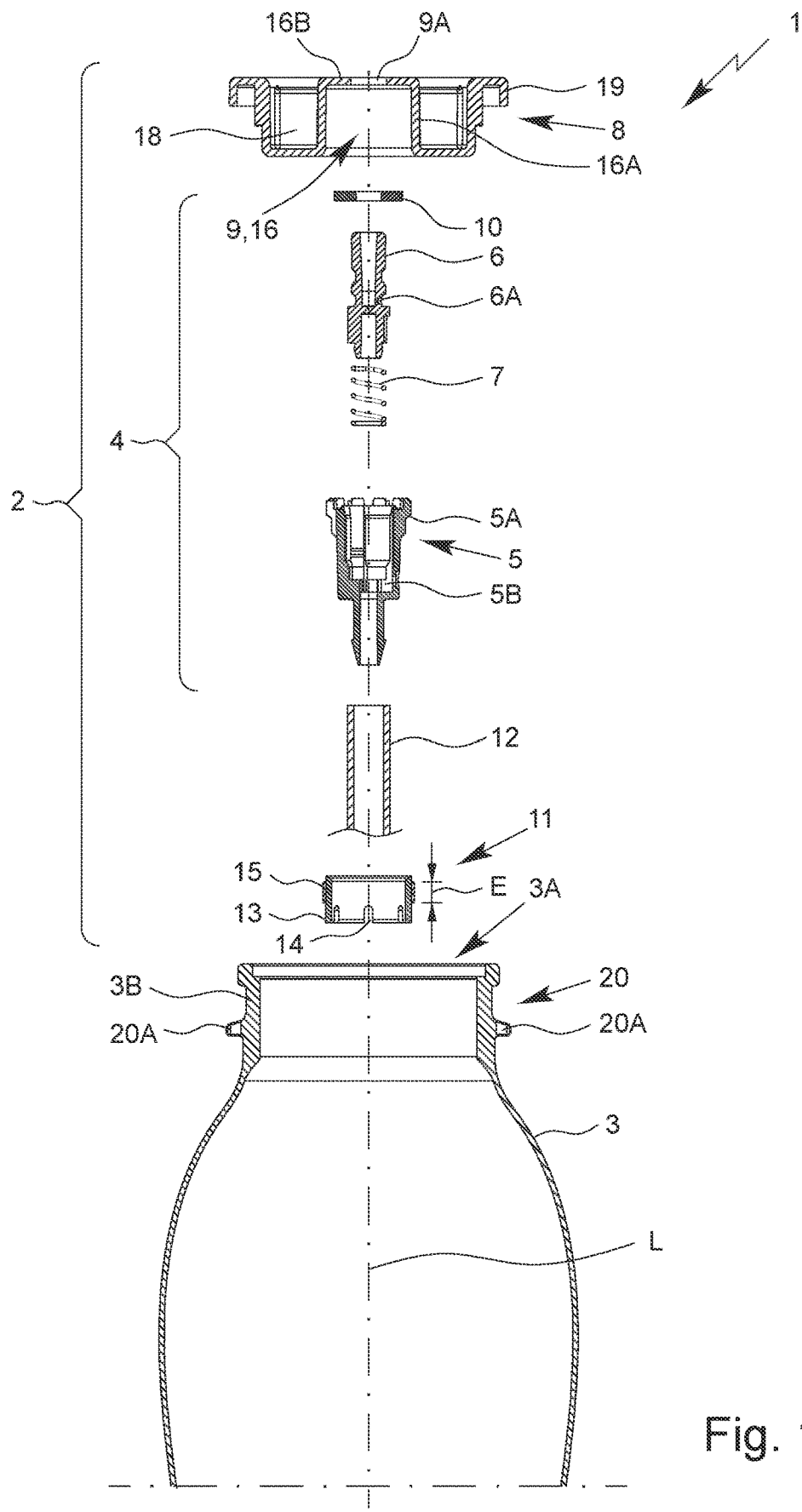
FIG. 1 an exploded view of a dispensing apparatus according to a first embodiment.
Figure 2:
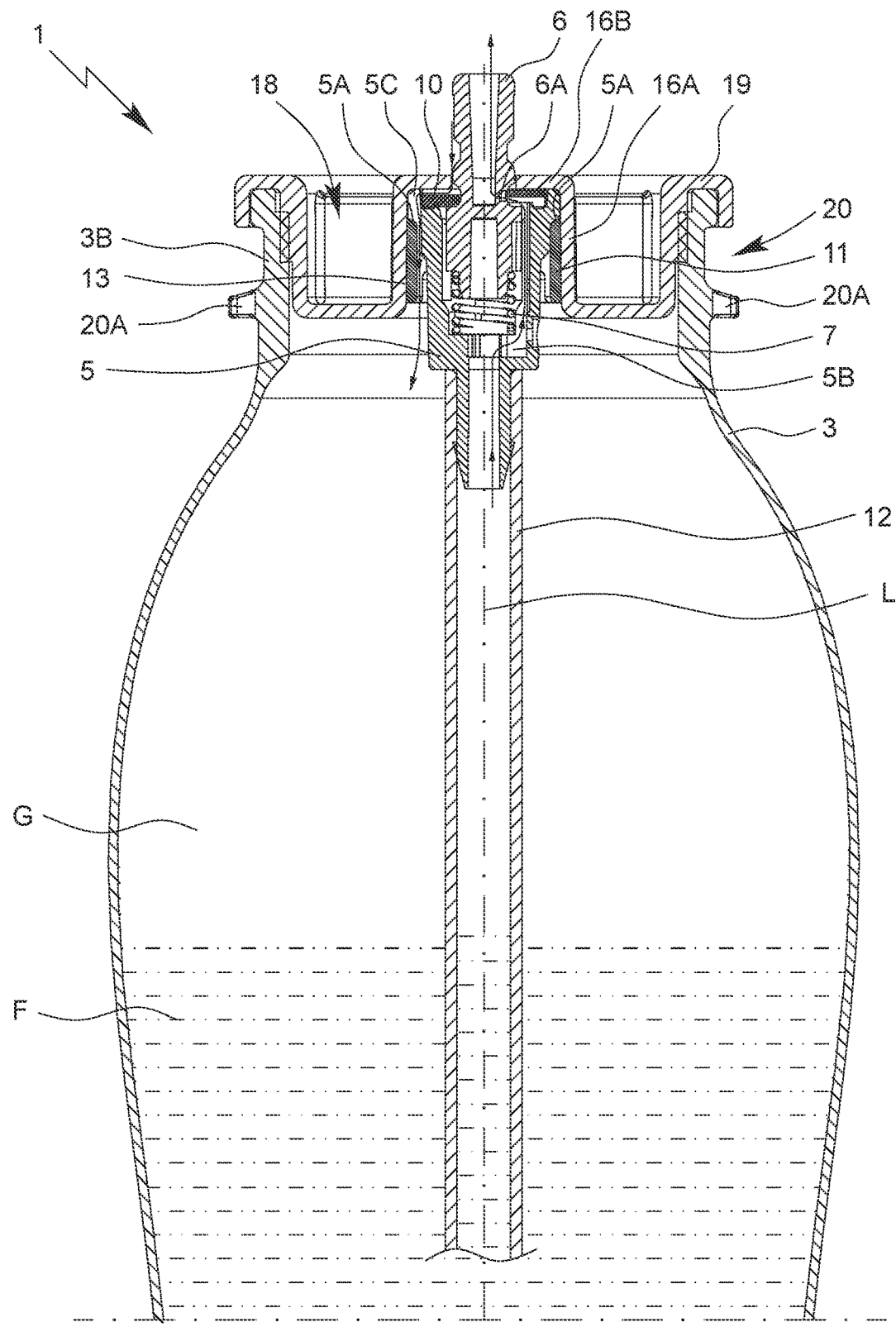
FIG. 2 a section of the dispensing apparatus of FIG. 1 in assembled state.

FIGS. 1 and 2 show a dispensing apparatus 1 according to a first embodiment. FIG. 2 shows the dispensing apparatus 1 according to the first embodiment in a completely assembled state.

The dispensing apparatus 1 has a proposed valve arrangement 2 and a container 3. The valve arrangement 2 is preferably at least partially arrangeable or arranged in an opening 3A of the container 3. In particular, in the case of the (completely assembled) dispensing apparatus 1, the container 3 or its opening 3A is closed or sealed by the valve arrangement 2.

The valve arrangement 2 has a valve 4 and a valve plate 8.

The valve 4 has a valve housing 5, a movable valve element 6 and preferably a reset element 7. In the illustrative example, the reset element 7 is preferably designed as a compression spring and/or as a coil spring. However, in deviation from the illustrative example, the reset element 7 can also have any other geometric shape by which an (elastic) restoring force and/or spring force can be or is realized. The reset element 7 can consist of plastic or metal.

The valve element 6 is preferably movable within the valve housing 5 and/or axially to the valve housing 5. Preferably, the valve element 6 is preloaded by means of the reset element 7 to a position in which the valve element 6 closes the valve 4 and/or in which the valve 4 is closed.

In the present invention, an "axial" direction or movement is understood to be a direction or movement which runs along or parallel to a main dispensing direction or central axis and/or longitudinal axis L of the dispensing apparatus 1. Similarly, the term "radial" preferably also refers to the axis L.

In the figures, the section through valve housing 5 to the left of the axis L runs in a different plane than to the right of the axis L, namely between two of the ribs on the outside of the valve housing, which can be seen in figures, instead of through one of the ribs. This makes it easier to see the path of the fluid when filling the dispensing apparatus 1, as explained later, particularly in FIG. 2.

The valve plate 8 is preferably designed and/or provided for receiving and/or holding the valve 4 and/or for fixing the valve 4 to the container 3.

The valve plate 8 preferably has a receptacle 9 to receive/accommodate the valve 4. The receptacle 9 preferably has a central or centrally arranged opening or aperture 9A.

Preferably, the container 3 or its opening 3A is closed and/or sealed fluidically and/or gastight by means of the valve plate 8.

Furthermore, the valve arrangement 2 and/or valve 4 preferably has a seal 10 for sealing the valve 4 against the valve plate 8. The seal 10 is preferably ring-like and/or disk-like.

The seal 10 is preferably deformable and/or preferably consists of a flexible and/or elastically deformable material.

Preferably, the valve housing 5, the valve element 6, the seal 10 and optionally the reset element 7 can be connected and/or joined together so that the valve 4 can be pre-assembled. In particular, the valve 4 pre-assembled in this way forms a coherent assembly which can be inserted as a whole into the valve plate 8. In other words, the valve housing 5, the valve element 6, the seal 10 and the reset element 7 can preferably be joined and/or pre-assembled in such a way that the valve 4 can be handled as a coherent valve 4 when the valve arrangement 2 and/or the dispensing apparatus 1 is assembled, in particular without the parts separating from each other during assembly. This is conducive to easy handling, as the number of individual components to be handled during assembly is reduced.

Preferably, the valve arrangement 2 has a (separately produced) fixing part 11 for fixing the valve 4 and/or valve housing 5 to the valve plate 8. The fixing part 11 is preferably connectable or connected to the valve plate 8 by bonding.

The valve housing 5, the valve element 6, the reset element 7, the valve plate 8, the seal 10 and the fixing part 11 preferably form components that are structurally separate from each other and/or produced separately.

Preferably, the valve plate 8, the fixing part 11, the valve arrangement 2, the valve 4, the valve housing 5, the valve element 6, the reset element 7 and/or the container 3 consist of plastic, in particular PET/polyethylene terephthalate.

Preferably, the container 3 and/or the dispensing apparatus 1 is fillable with a fluid F, in particular after assembling the valve arrangement 2. Preferably, the dispensing apparatus 1 and/or container 3 is filled with a compressed gas and/or propellant gas G in addition to the fluid F, so that the fluid F is pressurized in the container 3 and/or dispensing apparatus 1. Preferably, there is an overpressure in the dispensing apparatus 1 caused by the propellant gas G.

Furthermore, the dispensing apparatus 1 may have other means for dispensing fluid F not shown in the figures, in particular in the form of a nozzle, a spray head or the like. This enables in particular the (controlled) dispensing of the fluid F in a desired dispensing form, for example as a foam or spray/aerosol, and/or the production of a desired dispensing form.

The valve 4 can preferably be opened and closed, in particular by a movement of the valve element 6 relative and/or axial to the valve housing 5.

Preferably, to dispense fluid F, the valve element 6 is pressed and/or moved into the valve housing 5 against the force of the reset element 7 and/or the spring, preferably, for example, by means of a dispensing head or spray head not shown, which can in particular be plugged onto the free end of the valve element 6 or connected thereto, so that the valve 4 opens. The pressure of the propellant gas G then expels the fluid F from the container 3 through the valve 4.

Preferably, a supply or rising/ascending line 12 is provided, which is arranged at and/or connected to the valve 4 and/or valve housing 5, through which the fluid F can first rise during dispensing, in order to be dispensed via the valve 4 in the usual position of use with the container 3 pointing downwards.

When dispensing, the fluid F passes from the rising line 12 into an internal space 5B of the valve housing 5. When the valve element 6 is pressed down, a transverse channel and/or radially extending channel 6A of the valve element 6 is preferably released, which is sealed by the seal 10 when the valve 4 is in the closed state. After passing through the channel 6A, the fluid F emerges at the top of the valve element 6. The path of the fluid F during dispensing is indicated by an arrow on the right-hand side in FIG. 2.

The valve 4, in particular the valve housing 5, is preferably held and/or fixed to the valve plate 8 by means of the fixing part 11.

The valve plate 8 preferably has an inner side and an outer side. The inner side of the valve plate 8 is the side which is assigned to the interior of container 3 and/or, after assembly, faces the interior of the container 3. In FIGS. 1 and 2, the lower side or bottom side of the valve plate 8 is the inner side. The outer side of the valve plate 8 is the side of the valve plate 8 facing away from the interior of the container 3. In FIGS. 1 and 2, the upper side or top side of the valve plate 8 is the outer side.

Figure 3:
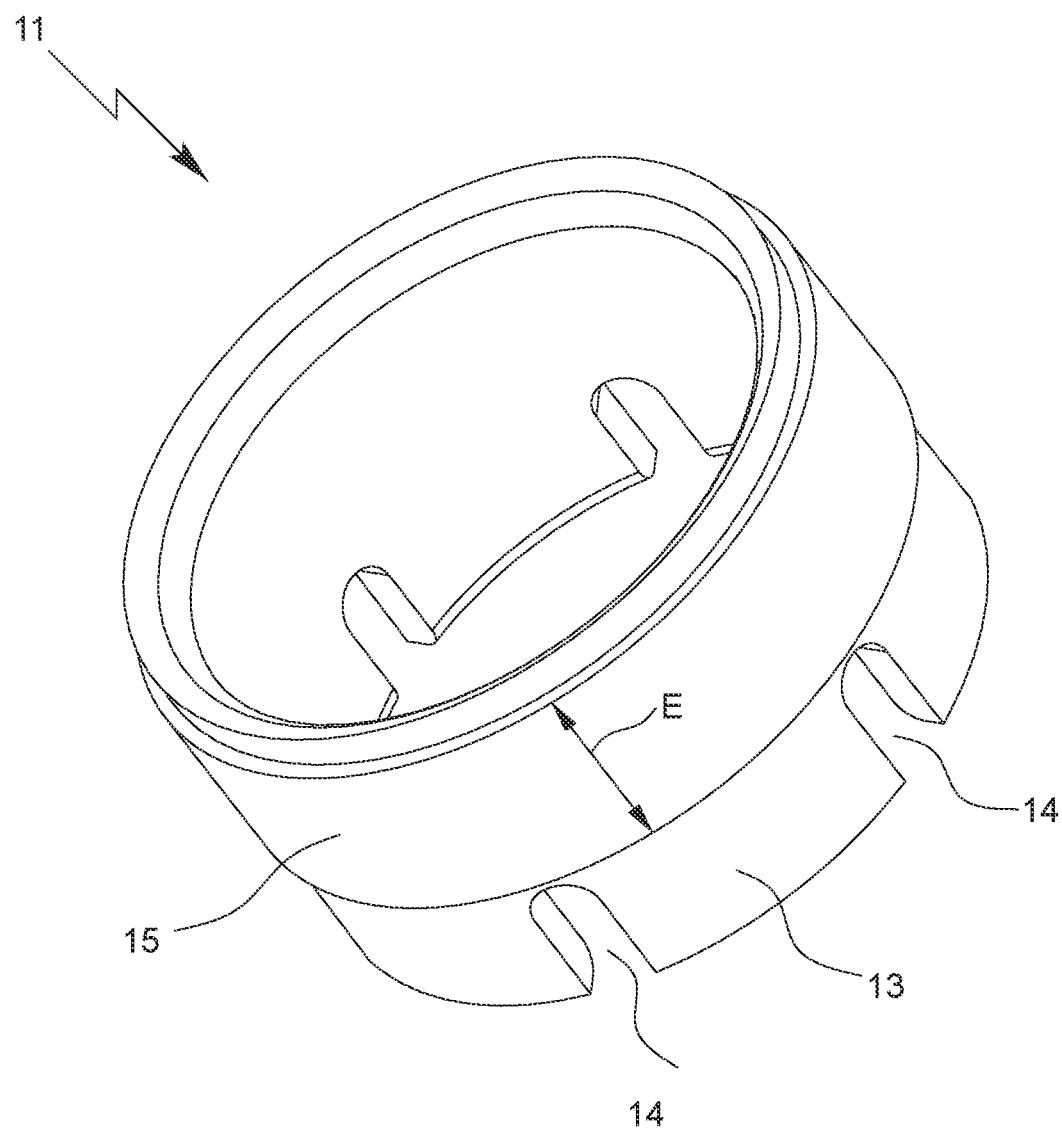
FIG. 3 a perspective view of a fixing part according to the first embodiment.

In FIG. 3, the fixing part 11 according to the first embodiment is shown.

The fixing part 11 is preferably designed ring-like and/or at least essentially cylindrical and/or hollow cylindrical or sleeve-like.

Preferably the fixing part 11 has a coupling portion 13. The coupling portion 13 is preferably designed for rotationally fixed coupling of the fixing part 11 with a (not shown) head and/or tool during assembly. The head is preferably designed complementary to the fixing part 11 and/or the coupling portion 13.

The coupling portion 13 is preferably arranged or formed on a cylindrical portion or region of the fixing part 11.

Particularly preferably, the coupling portion 13 is arranged and/or formed on an end face and/or at an axial end of the fixing part 11 or the cylindrical portion, as shown in particular in FIG. 3.

The coupling portion 13 preferably has or is formed by one or more axially extending projections or recesses 14.

In the example shown in FIG. 3, the recesses 14 are preferably elongated and/or formed as axially extending notches or cutouts.

The cutouts or recesses 14 are preferably evenly distributed around the circumference of the fixing part 11. In the example according to FIG. 3, the fixing part 11 and/or the coupling portion 13 has six recesses 14. However, other solutions are also possible here.

For the assembly of the valve arrangement 2 according to the first embodiment, the valve 4 with the valve housing 5, the valve element 6, the reset element 7 and the seal 10 is preferably arranged in the assigned receptacle 9 of the valve plate 8, in particular inserted into the receptacle 9 from the inner side or underside of the valve plate 8. Before, at the same time or afterwards, the fixing element 11 is preferably slid over the valve 4 and/or valve housing 5.

Subsequently, the valve 4 and/or valve housing 5 and/or fixing part 11 is secured and/or fixed to the valve plate 8, preferably by joining the fixing part 11 to the valve plate 8 with a material bond, in particular by welding, particularly preferably friction welding.

The friction welding is performed by pressing the two components to be joined together against each other and rotating them relative to each other at high speed. Due to the high speed of rotation, the components to be joined heat up due to the friction to such an extent that the components melt or are melted or plasticized at least at their contact surface and thus bond to each other. Preferably, the components to be welded are of the same type or made of the same or a similar material. If necessary, however, friction welding can also be used to weld together components made of different materials, for example metal and plastic parts.

Particularly preferably, the fixing part 11 is radially welded with the valve plate 8. In particular, thus, the weld seam or welded joint forms a connection which extends radially between the fixing part 11 and the valve plate 8 or a portion of the valve plate 8 or runs radially and/or connects the fixing part 11 and the valve plate 8 radially with each other.

The weld seam or welded joint is preferably ring-like and/or circumferential, in particular with respect to the axis L.

The fixing part 11 preferably has a welding region 15.

The welding region 15 is preferably located on an outer side and/or circumferential surface of the fixing part 11 or a cylindrical portion of the fixing part 11, at least in the first embodiment.

Preferably, the welding region 15 is ring-like or bead-like and/or the welding region 15 surrounds the fixing part 11, in particular completely. In particular, the welding region 15 is formed like a ring groove and/or the welding region 15 forms a thickening of the fixing part 11. Preferably, the welding region 15 projects or protrudes radially from the fixing part 11. The welding region 15 preferably forms a shoulder, a step or a projection on the outer side of the fixing part 11.

The welding region 15 is in particular designed to be melted and/or plasticized during welding or friction welding, so that the bonded connection and/or welded joint of the fixing part 11 with the valve plate 8 is created.

In the present invention, "plasticizing" is understood to mean in particular a process by which a material, in particular plastic or metal, is transformed, preferably by heating, into a state in which it is plastically deformable.

The welding region 15 is preferably designed with a particularly large area.

In particular, the welding region 15 has an extension E of at least 3 mm, preferably about 5 mm or more, in the axial direction or axially or parallel to the longitudinal axis L.

Preferably, the welding region 15 is arranged centrally in the axial direction and/or at a distance from the axial end sides of the fixing part 11. However, other solutions are also possible here.

Figure 4:
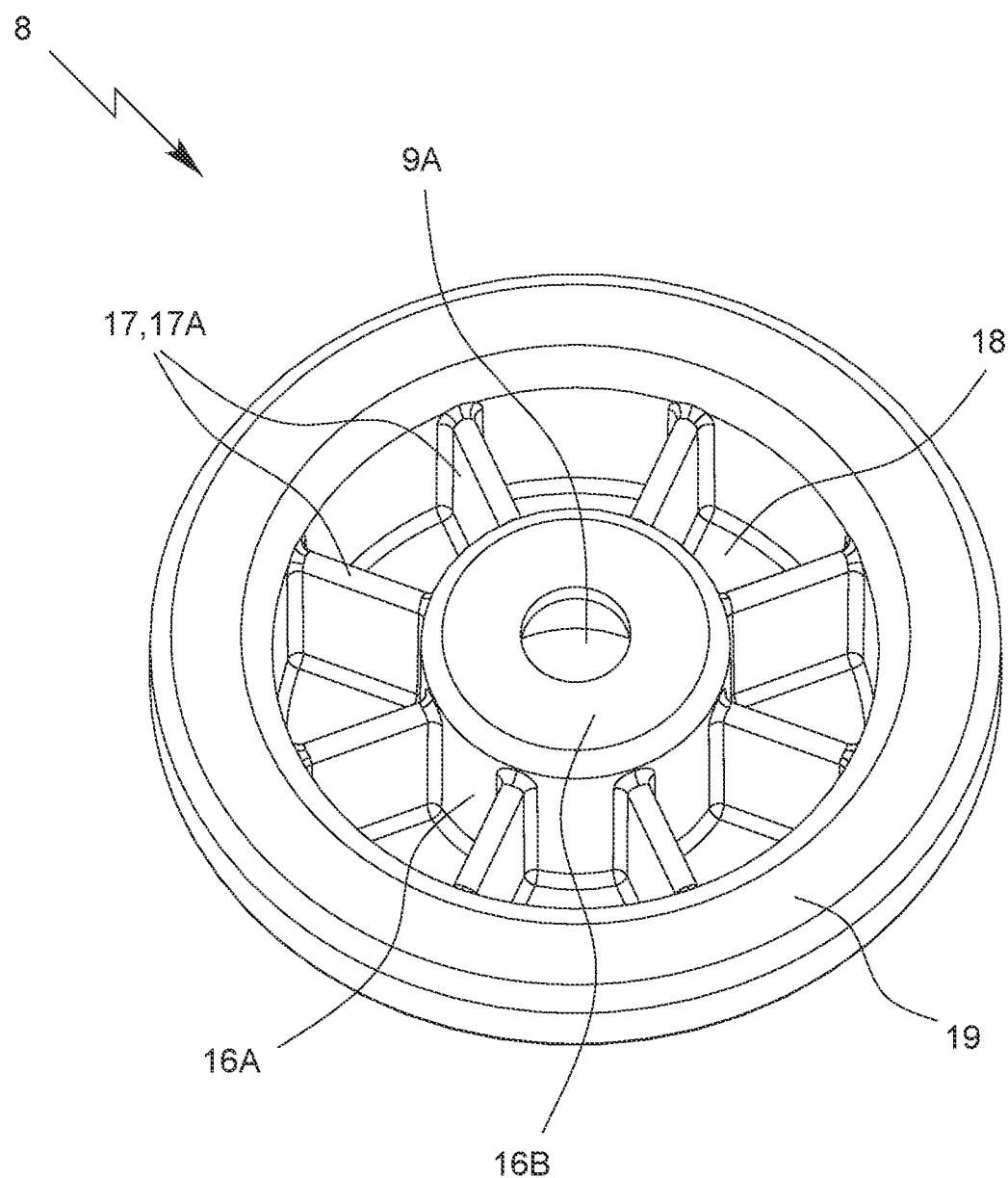
FIG. 4 a perspective view of a valve plate according to the first embodiment.

In FIG. 4, the valve plate 8 according to the first embodiment is shown.

The valve plate 8 and/or the receptacle 9 preferably has a receiving space 16 to accommodate/receive the valve 4 and/or the valve housing 5. In particular, the receiving space 16 is arranged at the valve plate 8 in the middle and/or centrally and/or symmetrically to the axis L.

In the illustrative example according to FIG. 4, the receiving space 16 is located on the inner side of the valve plate 8. The receiving space 16 is preferably at least essentially cylindrical.

The receptacle 9 is preferably formed by the receiving space 16 and/or a wall of the valve plate 8 which forms and/or delimits the receiving space 16. The wall of the valve plate 8 preferably has a cylindrical, in particular axially running, wall portion 16A and a wall portion 16B formed like a circular disk, running transversely or perpendicularly to the longitudinal axis L, which axially delimits or closes off the receptacle 9 and/or the receiving space 16. The wall portions 16A, 16B will also be referred to in the following as portions 16A, 16B for short. Preferably, the cylindrical portion 16A delimits the receptacle 9 and/or receiving space 16 laterally and/or the cylindrical portion 16A forms a lateral surface of the receiving space 16 and/or receptacle 9.

The circular disk-like portion 16B of the wall preferably has a central opening or aperture 9A for the passage of the valve element 6 to the outside or for pushing in the valve element 6 from the outside.

The opening or aperture 9A for the valve element 6 has a smaller diameter than the receiving space 16, so that the portion 16B holds or can hold the valve 4 and/or the valve housing 5 and the seal 10 axially in the receptacle 9 and/or the receiving space 16 by form-fit.

Preferably, the fixing part 11, in particular together with the valve 4 and/or valve housing 5, is arranged in the receiving space 16, in particular arrangeable radially between the valve housing 5 and the portion 16A of the valve plate 8, as can be seen in particular in FIG. 2.

The outer diameter of the fixing part 11 and/or welding region 15 and the (inner) diameter of the receiving space 16 are preferably matched to one another in such a way that the outer diameter of the fixing part 11 and/or welding region 15 is slightly larger, in particular by at least 0.1 mm and/or at most 2 mm, than the associated (inner) diameter of the receiving space 16 and/or portion 16A, so that the fixing part 11 can be friction-welded with the receiving space 16 and/or portion 16A of the valve plate 8.

In the illustrative example, the fixing part 11 is preferably not or not completely or not up to its assembly position axially insertable into the receiving space 16 without deformation. Preferably, the welding region 15 protrudes radially from the fixing part 11, so that the fixing part 11, initially and/or before the friction welding process begins, can be inserted axially by a small amount into the receiving space 16 and/or can be centered in the receiving space 16, until the shoulder formed by the welding region 15 comes into contact with the portion 16A.

The "too large" diameter of the fixing part 11 has the effect in particular that, during rotation of the fixing part 11 and/or during friction welding of the fixing part 11 to the valve plate 8, while the fixing part 11 is moved axially into its assembly position, the welding region 15 is melted and/or plasticized by frictional heat so that the fixing part 11 is deformed at least in the welding region 15 and can be completely inserted into the receiving space 16, the fixing part 11 connecting with the valve plate 8 in a bonded manner.

Inverse solutions are also possible, in which, instead of the fixing part 11, the receiving space 16 or the portion 16A has the welding region 15, in particular on an inner side. In this case, the previous explanations preferably apply inversely or analogously.

Preferably, the valve 4 and/or valve housing 5 is held axially in the valve plate 8 in a form-fit manner by the fixing part 11 on the one hand and by the portion 16B of the valve plate 8 on the other hand.

Preferably, the valve housing 5, in particular on the outside, has or forms a widening or shoulder 5A. The shoulder 5A preferably projects radially from the valve housing 5. Preferably, the shoulder 5A is formed by one or more elements or ribs which project and/or protrude radially from an at least substantially cylindrical portion of the valve housing 5.

The valve housing 5 is preferably axially supported with the shoulder 5A on the fixing part 11 or vice versa. The shoulder 5A preferably forms a stop for the fixing part 11.

Preferably, in the case of the completely assembled dispensing apparatus 1 and/or valve arrangement 2, the fixing part 11 lies firmly against the valve housing 5 and the valve housing 5 lies firmly against the valve plate 8, so that the valve housing 5 is held (at least axially) firmly and/or immovably between the valve plate 8 and the fixing part 11.

Radially, the valve housing 5 is preferably held firmly and/or immovably and/or form-fittingly in the receptacle 9 and/or the receiving space 16 in that the ribs, which have and/or form the shoulder 5A, lie radially against the portion 16A or its inner side.

The valve plate 8 preferably has a coupling device 17. The coupling device 17 is preferably designed for the rotationally fixed coupling of the valve plate 8 with a tool and/or holder 27, so that the valve plate 8 can be held and/or rotated in particular by form-fit during friction welding with the tool and/or holder 27.

The coupling device 17 is preferably located on the outer side of the valve plate 8.

The valve plate 8 preferably has an annular space 18 coaxial to the axis L. The coupling device 17 is preferably formed or arranged in the annular space 18.

On the circumference, the annular space 18 is preferably delimited by the (wall) portion 16A.

Particularly preferably, the coupling device 17 is formed by or has radially extending webs, ribs or coupling elements 17A. The coupling elements 17A are preferably arranged or formed on the outer side of the valve plate 8, in particular in the annular space 18.

In the example shown in FIG. 4, the coupling elements 17A are formed by walls or wall elements extending radially in the annular space 18, preferably wherein the coupling elements 17A divide the annular space into sectors.

According to another aspect, which can also be realized independently, on the dispensing apparatus 1, the valve plate 8 is preferably friction-welded with the container 3.

Preferably, the valve plate 8 has a collar 19 at an outer edge. However, embodiments without collar 19 are also possible, which will be discussed later, in particular with reference to FIGS. 10 and 12.

Preferably, the collar 19 forms an annular groove open at the bottom and/or in the direction of the container 3 for receiving the edge 3C of the container 3.

Preferably, the valve plate 8 is friction-welded in the region of the collar 19 with a wall forming or delimiting the opening 3A of the container 3. Preferably, the collar 19 surrounds the wall forming the opening 3A.

A seal or sealing ring may also be provided, which is preferably arranged in the collar 19 before welding the valve plate 8 to the container 3, in particular to ensure a tight closure of the container 3.

The container 3 preferably has a coupling portion 20. The coupling portion 20 is arranged in particular in a neck region 3B of the container 3 which surrounds and/or forms the opening 3A.

The coupling portion 20 is preferably designed for the rotationally fixed coupling of the container 3 with a tool and/or holder 28 for and/or during friction welding of the valve plate 8 to the container 3. This is shown in particular in FIGS. 11 and 12.

Preferably, the coupling portion 20 is formed by or has one or more coupling elements 20A projecting radially from the container 3 and/or neck region 3B. The coupling elements 20A can be evenly distributed on the neck region 3B and/or container 3. It is also possible that the coupling portion only has one coupling element 20A collar-like surrounding the container 3 and/or the opening 3A.

In the neck region 3B, the wall of the container 3 is preferably thicker and/or reinforced.

Preferably, a step and/or projection is formed in the neck region 3B of the container 3 and/or the collar 19 of the valve plate 8, which allows easy centering and/or positioning or initial guidance of the valve plate 8 in the opening 3A before friction welding.

The weld seam or welded joint formed during friction welding between the container 3/neck region 3B and the valve plate 8 preferably has an axial extension of at least 3 mm, in particular 5 mm or more. This ensures a secure fixing of the valve plate 8 to the container 3.

The propellant gas is preferably introduced under high pressure into the (completely assembled and preferably already filled with the fluid F) dispensing apparatus 1, in which the fixing part 11 is firmly connected with the valve plate 8 and the valve plate 8 is firmly connected with the container 3. Due to the high pressure, the propellant gas G deforms the seal 10 so that a gap is formed between the seal 10 and the portion 16B. The propellant gas G can now pass first between the valve element 6 and the portion 16B and then through the gap between the seal 10 and the portion 16B. The propellant gas G then passes through channels 5C, formed between the ribs of the valve housing 5, which form the shoulder 5A, and the portion 16A, past the valve housing 5 and the fixing part 11 into the interior of the container 3. The path of the propellant gas G when filling the dispensing apparatus 1 is indicated by an arrow on the left side in FIG. 2.

In the following, a second embodiment of the dispensing apparatus 1 and/or valve arrangement 2 is explained in particular.

Figure 5:
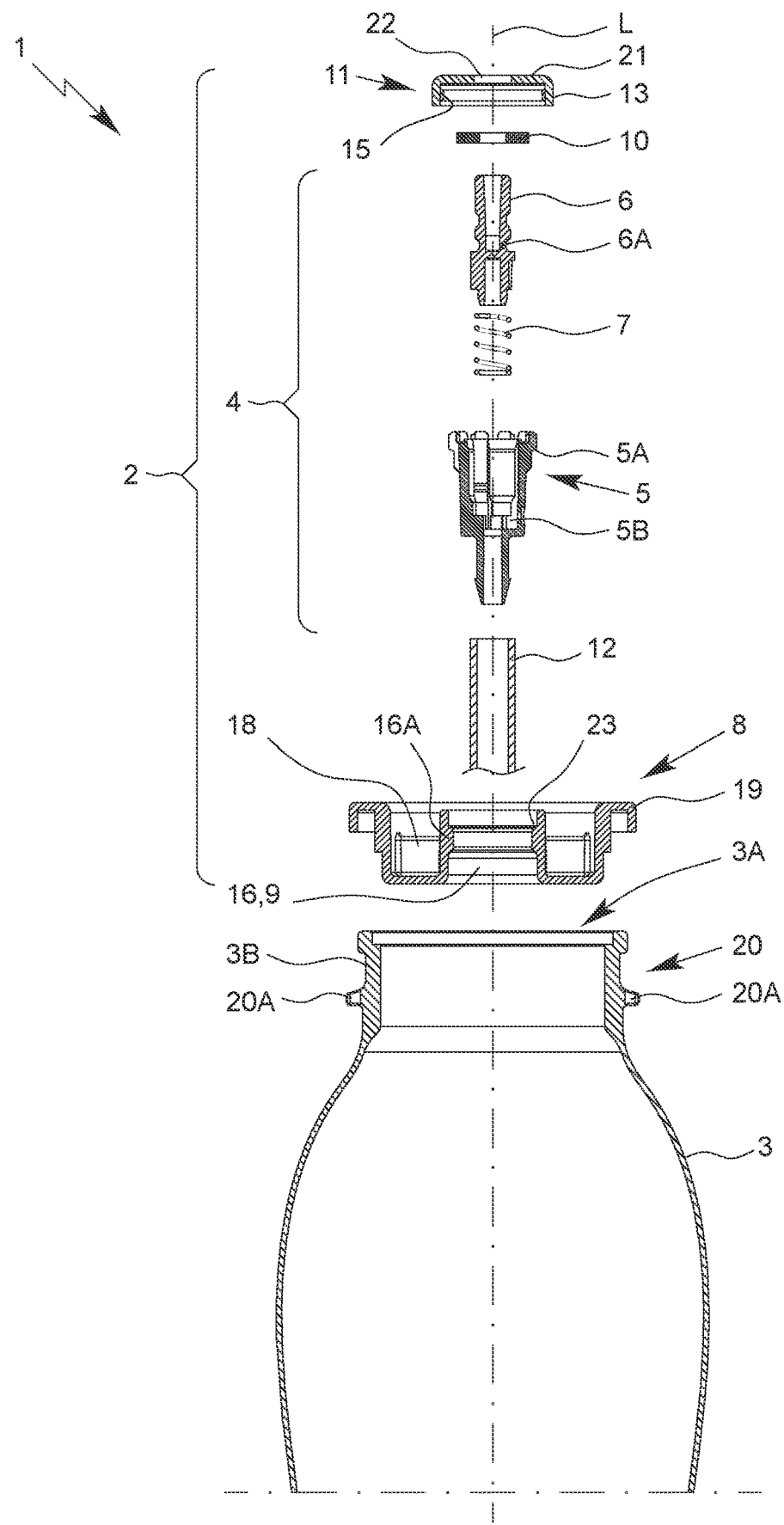
FIG. 5 an exploded view of a dispensing apparatus according to a second embodiment.
Figure 6:
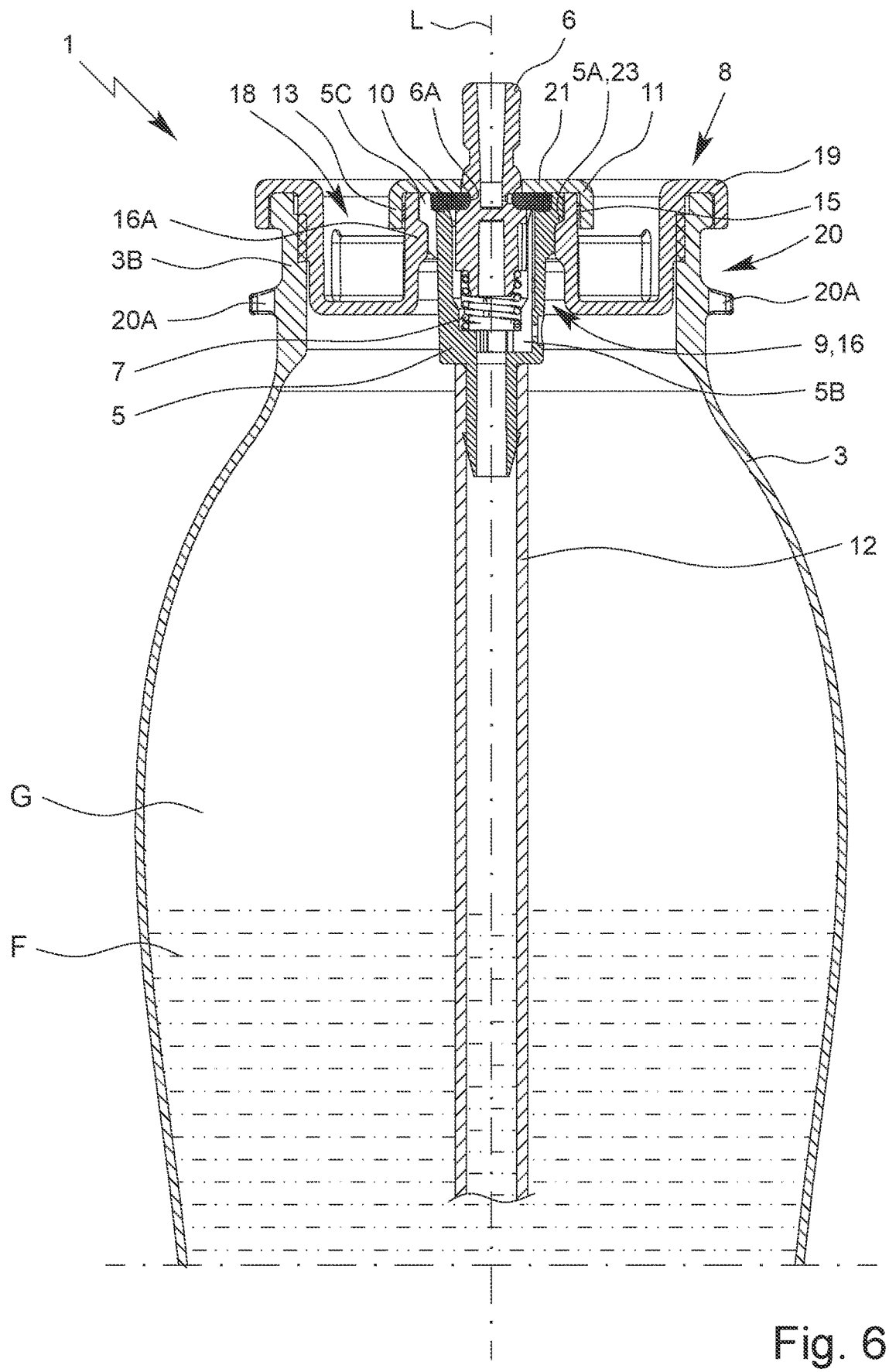
FIG. 6 a section of the dispensing apparatus of FIG. 5 in assembled state.
Figure 7:
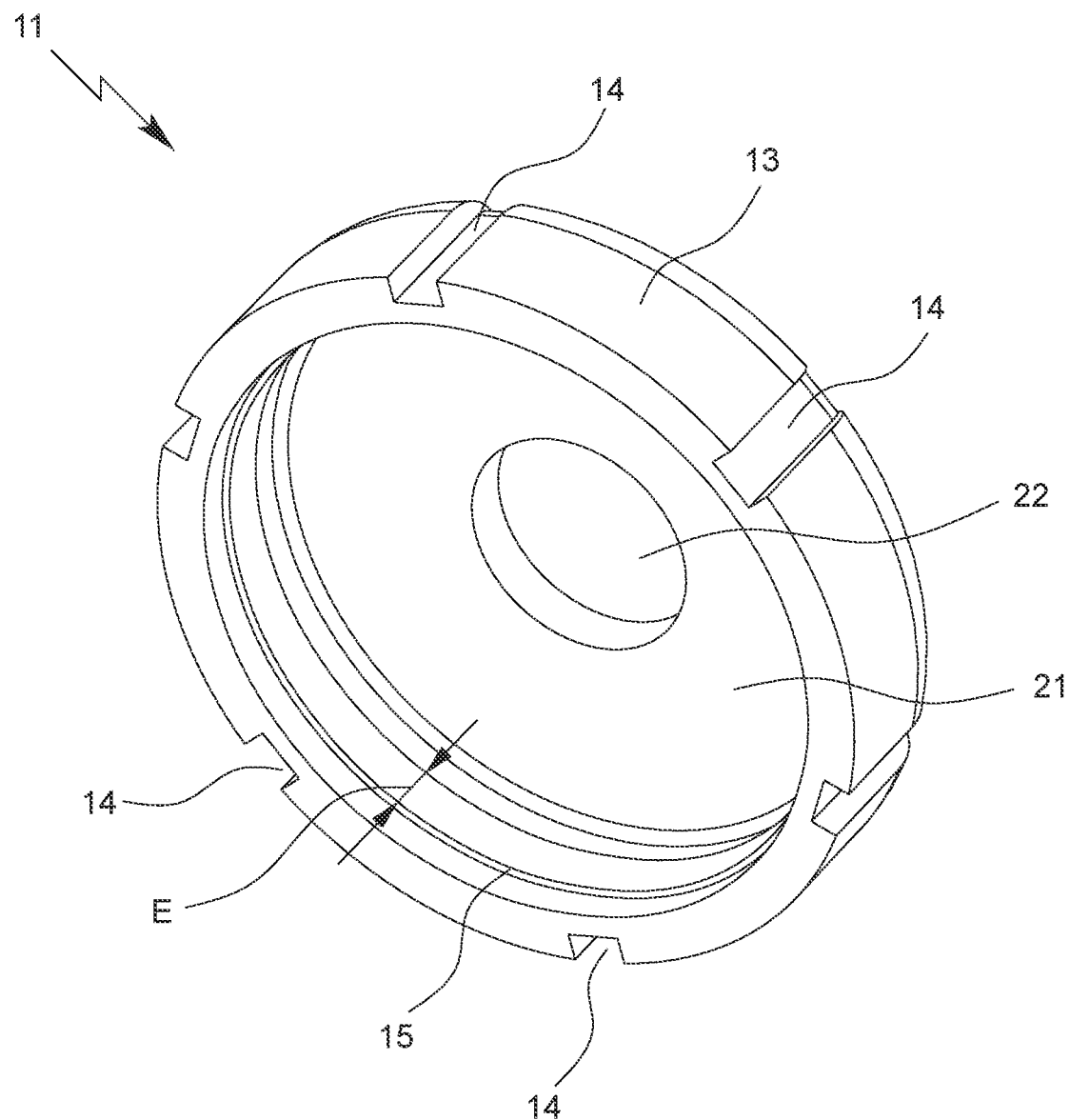
FIG. 7 a perspective view of a fixing part according to the second embodiment.
Figure 8:
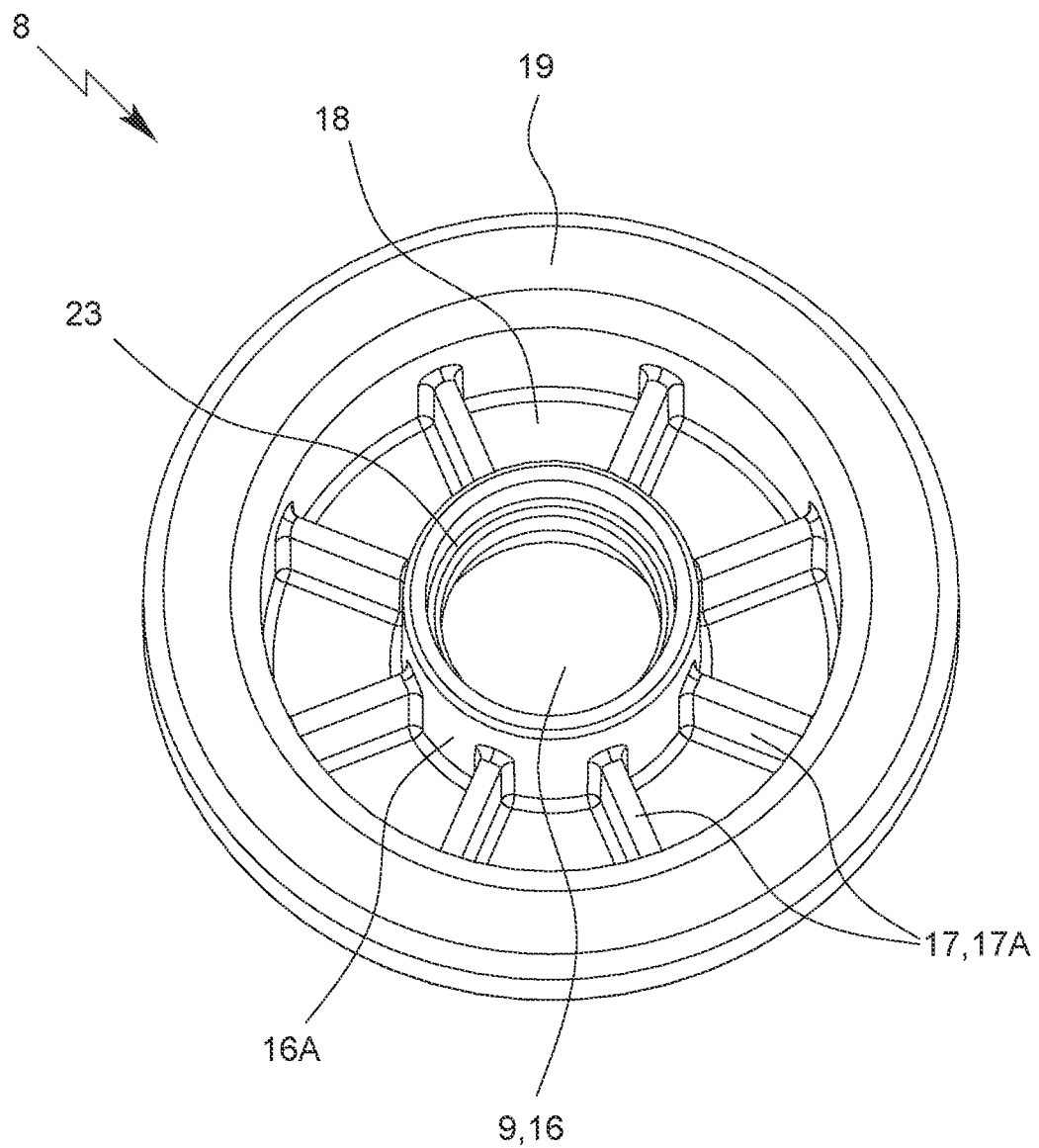
FIG. 8 a perspective view of a valve plate according to the second embodiment.

FIGS. 5 and 6 show a proposed dispensing apparatus 1 according to a second embodiment. In FIGS. 7 and 8 the fixing part 11 and the valve plate 8 according to the second embodiment are shown.

Preferably, only differences between the second embodiment and the first embodiment will be primarily dealt with in the following, so that the previous explanations and features apply to the second embodiment in particular correspondingly or supplementary, unless otherwise explicitly mentioned, even if a repeated description is omitted.

Preferably, the second embodiment differs from the first embodiment by a different design of the fixing part 11 and the valve plate 8.

The fixing part 11 is preferably designed cap-like. In particular, a hollow cylindrical, sleeve-like and/or ring-like portion of the fixing part 11 is adjoined at an end side by an end wall 21 running transversely, in particular perpendicularly, to the axis L.

The end wall 21 preferably has an aperture 22 for the valve 4 and/or valve element 6, which is preferably arranged centrally or in the middle.

In the example shown in FIG. 7, the coupling portion 13 has or is formed by recesses 14 in the form of elongated and/or axially extending radial indentations in the outer edge of the fixing part 11 or its cylindrical portion. However, other solutions are also conceivable here, for example radial projections.

The recesses 14 or indentations are preferably arranged symmetrically on the fixing part 11. In the illustrative example according to FIG. 7, the fixing part 11 and/or the coupling portion 13 has six recesses 14. However, other solutions are also possible here.

In the second embodiment, the fixing part 11 is preferably arranged on the outer side of the valve plate 8.

For the assembly of the valve arrangement 2 according to the second embodiment, preferably the valve 4 with the valve housing 5, the valve element 6, the reset element 7 and the seal 10 is preferably arranged in the assigned receptacle 9 of the valve plate 8, in particular inserted into the receptacle from the outer side or top side of the valve plate 8. Before, at the same time or afterwards, the fixing part 11 is preferably slid over the valve 4 and/or valve housing 5.

Subsequently, the valve 4 and/or valve housing 5 is preferably secured and/or fixed to the valve plate 8. Securing and/or fixing of the valve 4 and/or valve housing 5 to the valve plate 8 takes preferably place by connecting the fixing part 11 with the valve plate 8 in a bonded manner, in particular by welding.

Particularly preferably, the fixing part 11 is friction-welded with the valve plate 8.

The valve plate 8 according to the second embodiment differs from the valve plate 8 according to the first embodiment preferably (mainly) in the design and/or construction of the receptacle 9 and/or receiving space 16.

Preferably, the receptacle 9 and/or the receiving space 16 is at least essentially cylindrical. However, in contrast to the first embodiment, the receiving space 16 and/or the receptacle 9 is preferably not delimited on one side by a (wall) portion 16B of the valve plate 8 running transversely to the longitudinal axis L. In the second embodiment, the function of portion 16B is preferably taken over by the cover face 21 of the fixing part 11.

Preferably, a supporting surface 23 and/or a projection is formed or arranged in the receptacle 9 and/or receiving space 16. Due to the supporting surface 23, the diameter of the receiving space 16 is preferably reduced in the region of the supporting surface 23.

The supporting surface 23 may be formed by a plurality of individual elements arranged in the receiving space 16. Preferably, the supporting surface 23 is designed as a one-piece circumferential ring and/or axial stop for the shoulder 5A of the valve housing 5.

The supporting surface 23 is preferably designed to hold the valve 4 and/or valve housing 5 axially in the receptacle 9 and/or receiving space 16 in a form-fitting manner and/or to prevent the valve 4 and/or valve housing 5 from slipping through the receptacle 9 and/or receiving space 16.

The supporting surface 23 is preferably designed to lie against the shoulder 5A of the valve housing 5 and/or is assigned to the shoulder 5A of the valve housing 5. The supporting surface 23 preferably forms a stop.

The supporting surface 23 in the second embodiment preferably takes over at least partially the function of the fixing part 11 in the first embodiment, which holds the valve housing 5 form-fittingly by supporting on the shoulder 5A of the valve housing 5 in the receptacle 9 and/or the receiving space 16.

In the second embodiment, the fixing part 11 has the welding region 15 preferably on an inner side and/or on an inner edge of the cylindrical portion. The welding region 15 preferably projects radially inwards from the fixing part 11 or cylindrical portion. Preferably, the welding region 15 on the fixing part 11 according to the second embodiment is not arranged and/or formed at the fixing part 11 axially offset or shifted in relation to the coupling portion 13.

In the case of the fixing part 11 according to the second embodiment, the welding region 15 is preferably arranged on an inner side or inner surface of the fixing part 11 or a cylindrical portion of the fixing part 11.

The inner side of the fixing part 11 is preferably welded with the wall portion 16A, which forms the inner boundary and/or an inner wall of the annular space 18.

The inner diameter of the fixing part 11 and/or welding region 15 and the (outer) diameter of the portion 16A are preferably matched to each other in such a way that the inner diameter of the fixing part 11 and/or welding region 15 is slightly smaller, in particular by at least 0.1 mm and/or at most 2 mm, than the (outer) diameter of the portion 16A, so that the fixing part 11 can be friction-welded with the portion 16A. The fixing part 11 can therefore preferably not be slid over the portion 16A and/or the receiving space 16 without deformation. The "too small" diameter of the fixing part 11 has the effect in particular that, during rotation of the fixing part 11 and/or during friction welding the fixing part 11 to the valve plate 8, the welding region 15 is melted and/or plasticized by frictional heat, so that the fixing part 11 is deformable at least in the welding region 15 and can be slid over the receiving space 16, the fixing part 11 connecting with the valve plate 8 or its wall portion 16A in a bonded manner.

An inverse arrangement is also possible for the second embodiment, in which the welding region 15 is arranged on the outer side of the portion 16A instead of on the inner side of the fixing part 11.

In the following, in particular a third and fourth embodiment of the present invention will be explained on the basis of FIGS. 9A, 9B, 10, 11 and 12. In particular, differences to the first and second embodiment are primarily explained. Provided that no deviations or differences between the embodiments are explained, the above explanations preferably also apply to the third and fourth embodiment described below.

In contrast to the embodiments explained so far, it is preferably provided for the third and fourth embodiment that the fixing part 11 is laser-welded or ultrasonically welded with the valve plate 8 instead of friction-welded.

The fixing part 11 according to the third and/or fourth embodiment preferably has a first segment/portion 24 and a second segment/portion 25.

The first portion 24 is preferably cylindrical or hollow cylindrical. However, the first portion 24 can also be slightly conical. In this way, a clamping effect can be achieved when inserting the fixing part 11 or the first portion 24 into the receiving space 16 of the valve plate 8.

The second portion 25 preferably projects radially from the first portion 24 and/or is arranged at least substantially right-angled to the first portion 24.

The second portion 25 is preferably arranged at an axial end of the fixing part 11.

The second portion 25 is preferably flange-like or collar-like.

Preferably, the second portion 25 is designed for contact with the lower and/or radially extending delimiting surface of the annular space 18 of the valve plate 8.

The fixing part 11, in particular the second portion 25, preferably has the welding region 15. In particular, the welding region 15 is ring-like and/or arranged coaxially to the first portion 24. In principle, however, it is possible for the welding region 15 to be formed by a plurality of non-contiguous elevations, in particular small-area and/or spot-like elevations, so that no continuous weld seam 26 is formed during welding, but only punctiform welded joints.

Figure 9A:
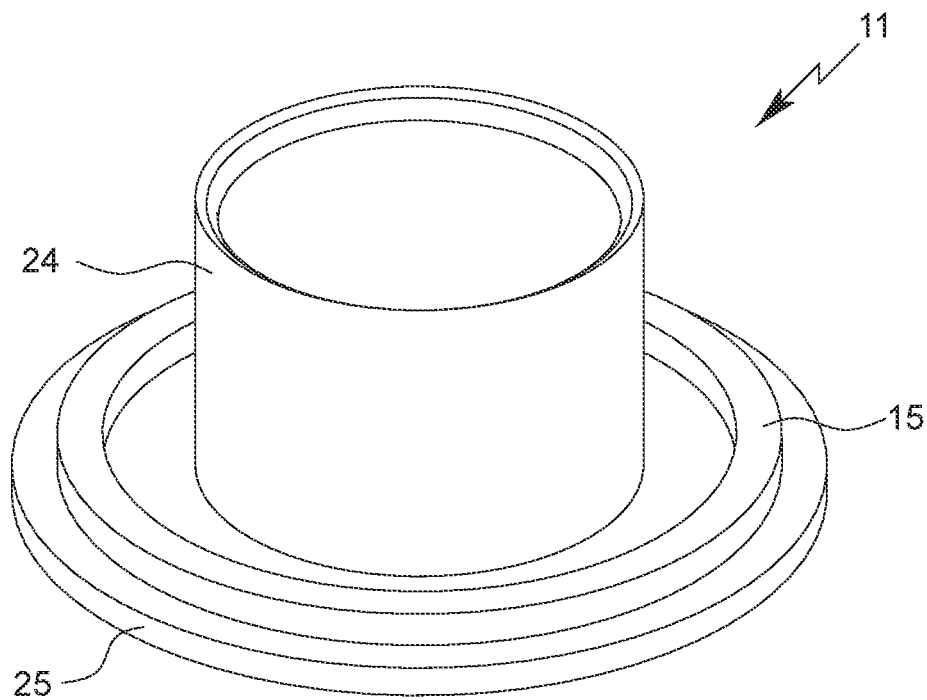
FIG. 9A a perspective view of a fixing part according to a third embodiment.
Figure 9B:
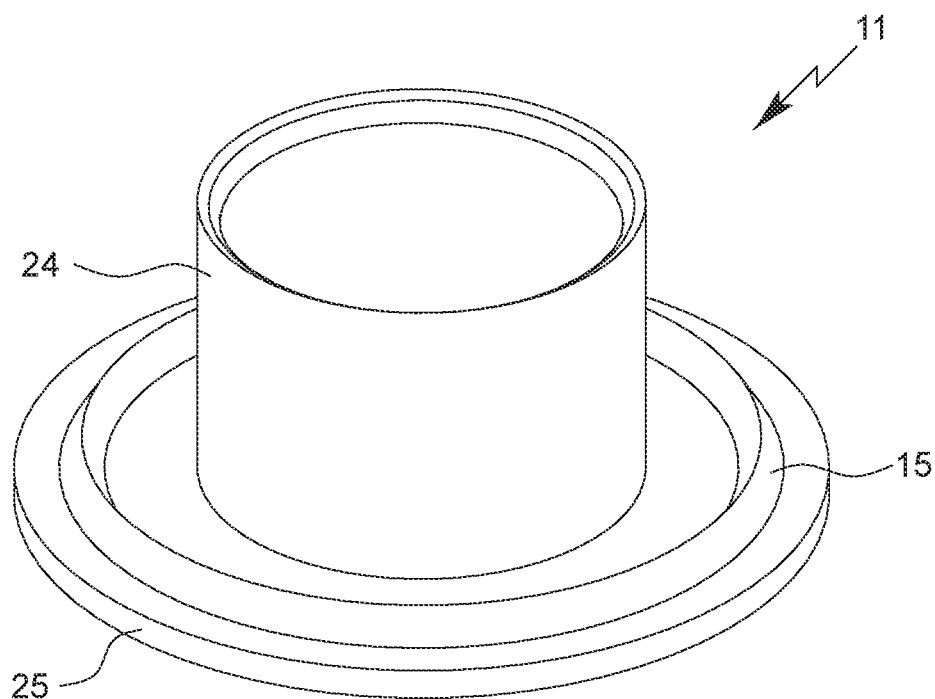
FIG. 9B a perspective view of a fixing part according to a fourth embodiment.

According to the embodiment shown in FIG. 9A, the welding region 15 (in cross-section) is rectangular. However, the welding region 15 can also have a triangular cross-section, as shown in particular in FIG. 9 B. In principle, however, other shapes of the cross-section of the welding region 15 are also possible, for example round, in particular semicircular, or other cross-sections.

The welding region 15 is in particular designed to plasticize during laser welding and/or ultrasonic welding and thus form a weld seam 26 between the fixing part 11 and the valve plate 8. In particular, it is possible that the fixing part 11 welded with the valve plate 8 does not lie with its entire surface against the valve plate 8, but preferably only in the region of the weld seam 26. This can compensate for unevenness and/or tolerances of the valve plate 8 and/or the fixing part 11. In particular, this reliably ensures that the seal 10 is firmly clamped in place and/or the valve housing 5 sits without play in the valve plate 8 and/or is clamped without play between the valve plate 8 and the fixing part 11.

The welding region 15 preferably forms an elevation and/or excess material of the second portion 25. The (axial) thickness and/or height of the welding region 15 is preferably more than 0.2 mm and/or less than 1.2 mm, in particular about 0.8 mm. Preferably, unevenness of the valve plate 8 and/or of the fixing part 11 and/or axial tolerances can be compensated by this.

For producing and/or connecting the valve arrangement 2, preferably first the valve 4 is inserted into the receptacle 9 and/or the receiving space 16, in particular from the inner side of the valve plate 8. Then preferably the fixing part 11 is also inserted into the receptacle 9 and/or the receiving space 16, so that the valve 4 is arranged between the valve plate 8 and the fixing part 11, in particular clamped between them.

The valve plate 8, the valve 4/valve housing 5 and the fixing part 11 are preferably dimensioned and/or matched to each other in such a way that the second portion 25 and/or the welding region 15 lies against an underside of the valve plate 8, in particular with its surface, when the fixing part 11 is completely inserted into the receptacle 9 and/or the receiving space 16 and/or the valve 4 is clamped between the valve plate 8 and the fixing part 11.

Preferably, the valve plate 8 is made of a laser-absorbing and/or dark, in particular black, material and the fixing part 11 or at least the second portion 25 is made of a transparent, in particular laser-transparent, material so that the valve plate 8 can be irradiated with a laser through the fixing part 11 to produce the welded joint with the fixing part 11. The laser beam can thus preferably pass through the fixing part 11 without being absorbed.

For joining/welding the valve plate 8 with the fixing part 11, preferably a laser transmission welding method or an ultrasonic welding method is used.

Preferably, the valve plate 8 and/or its inner side is irradiated with a laser through the fixing part 11. If the valve plate 8 is made of a laser-absorbing material, the material is heated by this. Preferably, the laser beam passes through the welding region 15 and/or the laser beam is directed onto the welding region 15. Due to the absorption in the valve plate 8, the material of the valve plate 8 is heated and thus melted and/or plasticized. This occurs in particular in the immediate vicinity of and/or at the contact surface to the welding region 15. Heat conduction processes preferably cause also heating and thus melting and/or plasticizing of the welding region 15, so that a weld seam 26 is produced between the valve plate 8 and the fixing part 11 and the valve plate 8 and the fixing part 11 are joined together with a material bond.

For laser welding and/or ultrasonic welding, the valve plate 8 and the fixing part 11 are preferably each made of a plastic, in particular PET.

A high-power diode laser, preferably with a wavelength of more than 900 nm and/or less than 1100 nm, or a solid-state laser, in particular a fiber laser or Nd:YAG laser, preferably with a wavelength of more than 1060 nm and/or less than 1090 nm, is preferably used for laser welding.

It is particularly preferred that the valve plate 8 is laser-welded or ultrasonically welded with the fixing part 11 and the valve arrangement 2 thus provided is friction-welded to the container 3 as described above.

It is also possible that the valve plate 8 is collarless and/or does not have a collar 19 for the edge 3C of container 3. This is shown in particular in FIGS. 10 and 12. In this case the valve plate 8 is preferably (axially) flush with the container 3 or the edge 3C of the container.

For joining, in particular friction welding, the container 3 with the valve plate 8 and/or the (pre-assembled) valve arrangement 2, the valve plate 8 and/or the valve arrangement 2 is first inserted into the container 3.

Inserting of the valve plate 8 can take place in a defined position/rotational position relative to the container 3.

When connecting the valve arrangement 2 with the container 3, the valve arrangement 2 is preferably held with a first holder and/or tool 27 and the container 3 is preferably held with a second holder and/or tool 28. This is shown schematically in FIGS. 11 and 12.

Figure 11:
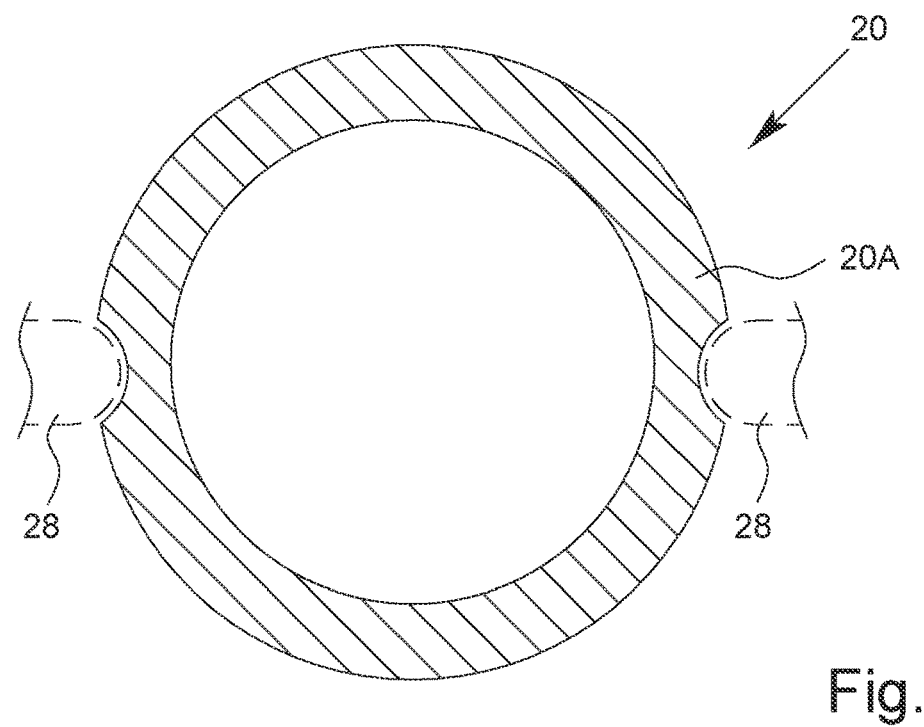
FIG. 11 a section of a container of the dispensing apparatus in the region of a coupling element.

According to the embodiment shown in FIG. 11, the coupling element 20A is designed as a collar surrounding the container 3 and/or the opening 3A and/or as a radially projecting element. Preferably, the coupling element 20A has one or more engagement elements, in particular opposite to each other, which are designed for engagement with the holder 28. In the illustrative example, the engagement elements are formed by recesses.

For friction welding, the container 3 and the valve arrangement 2 are moved axially towards each other and simultaneously rotated with respect to each other around the axis L. In particular, one of the parts, preferably the container 3, is held in a fixed position and the other part, preferably the valve arrangement 2, is rotated relative to it about the axis L.

The valve plate 8 is preferably held and/or turned or rotated by means of a tool 27 which engages form-fittingly in the valve plate 8 and/or its coupling device 17 and/or holds and/or grips the valve plate 8 at the coupling elements 17A.

During friction welding, the valve plate 8 and the container 3 are preferably moved axially towards each other until the valve plate 8 has reached a defined end position and/or axial position relative to the container 3. For this purpose, the valve plate 8 is preferably designed collarless and/or the valve plate 8 has no collar 19.

Preferably, the valve plate 8 is axially flush with the container 3 or its edge 3C in the end position and/or defined axial position. However, other solutions are also possible here.

Being flush makes it possible to reliably check the established connection between the container 3 and the valve plate 8 and/or valve arrangement 2 in a simple manner, since the flush connection and/or defined seat of the valve plate 8 is an indication of the correct or faultless connection. In particular, it is an indication of a faulty connection and/or welded joint if, after the connection has been made, the (collarless) valve plate 8 is not axially flush with the edge 3C of the container.

Alternatively or additionally, a defined number of rotations, for example exactly 12 rotations, is carried out during the friction welding of the container 3 with the valve plate 8. This ensures efficient, fast and reproducible joining/welding of the valve arrangement 2 with the container 3.

During the friction welding of the container 3 with the valve plate 8, an in particular ring-like and/or radial weld area 29 is preferably created. The weld area is in particular the region in which the material of the container 3 and/or the valve plate 8 is plasticized during friction welding and thus forms the bonded connection and/or weld.

The width of the weld area 29 and/or the extension of the weld area 29 in radial direction is preferably more than 0.1 mm and/or less than 0.5 mm, in particular about 0.3 mm. The length of the weld seam 29 and/or the extension of the weld seam 29 in the axial direction is preferably more than 0.5 mm, in particular more than 1 mm, and/or less than 2 mm, in particular less than 1.5 mm.

In operation, the dispensing apparatus 1 preferably has a dispensing head for dispensing the fluid F, which is not shown in the figures.

Figure 10:
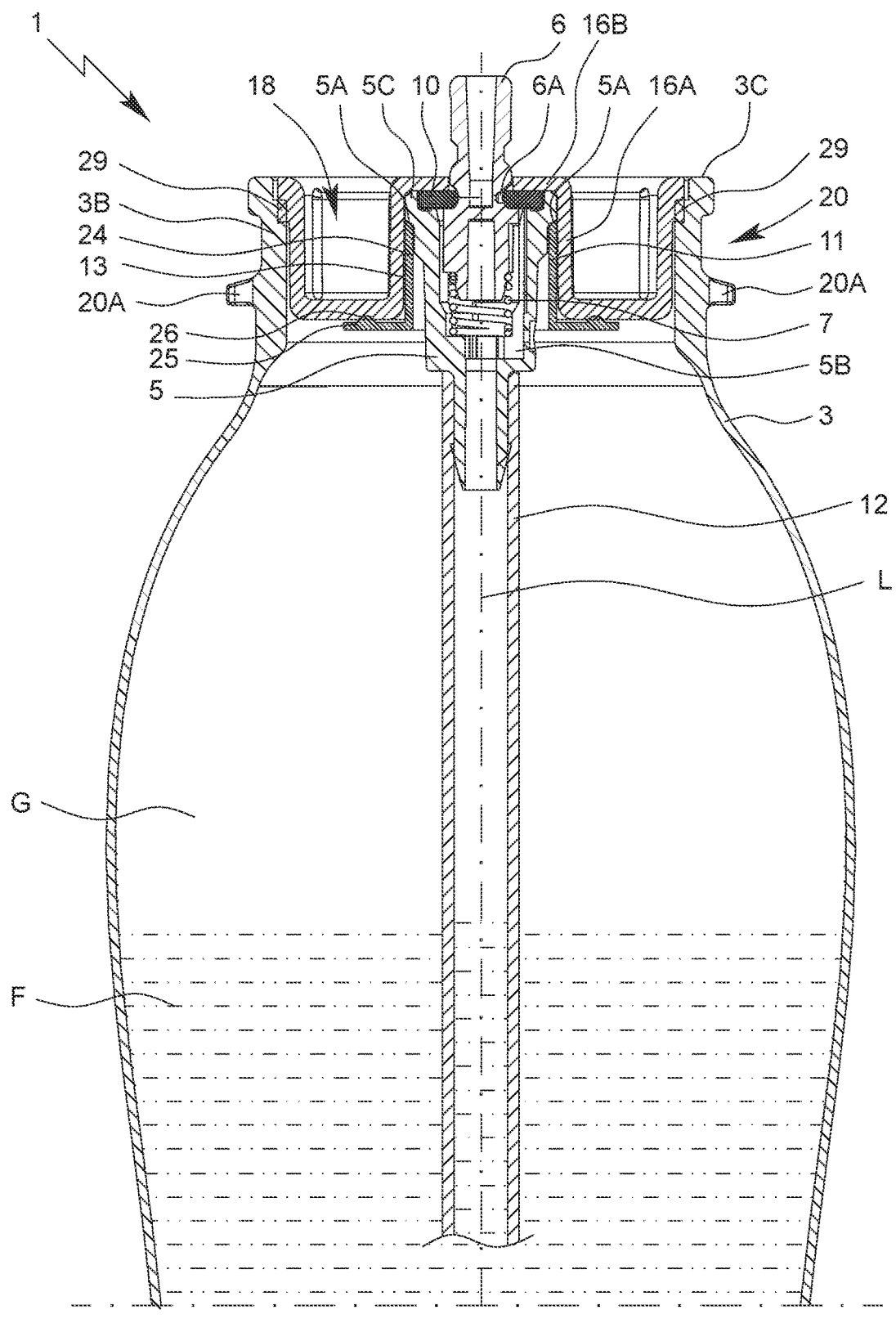
FIG. 10 a section of the dispensing apparatus according to the third and/or fourth embodiment.
Figure 12:
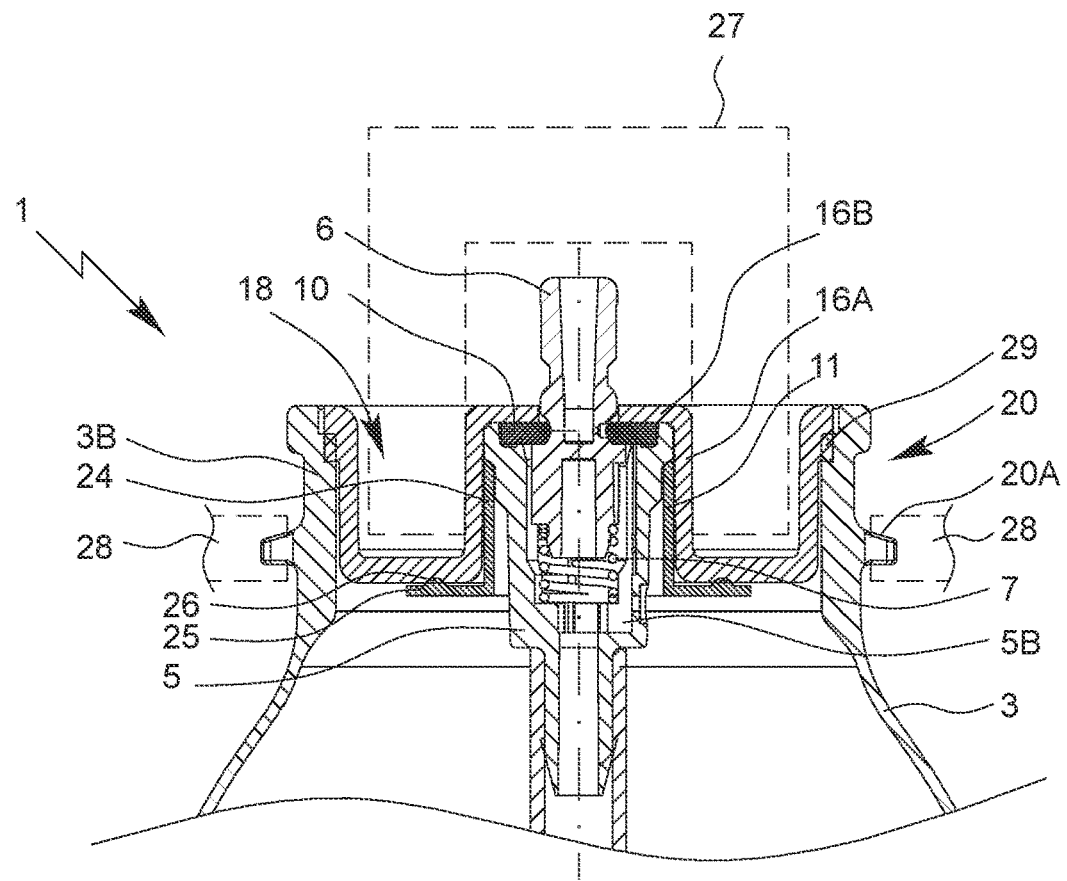
FIG. 12 a section of the dispensing apparatus according to FIG. 10 with additionally indicated tools.

In the embodiment shown in FIGS. 10 and 12, the edge 3C is preferably thickened and/or collar-like and/or flange-like. The edge 3C protrudes in particular radially from the neck region 3B.

This makes it possible to position the dispensing head directly at the edge 3C of the container 3, for example by means of a snap-in connection with the edge 3C.

Preferably, the dispensing head is connected and/or attached to the edge 3C by form-fit. Alternatively or additionally, the dispensing head can be supported on the edge 3C and/or the valve plate 8, in particular if the valve plate 8 is flush with the edge 3C.

According to another embodiment not shown in the figures, the coupling element 20A can be omitted or formed by the (thickened) edge 3C. In this case it is not necessary to provide a coupling element 20A in addition to the edge 3C. The edge 3C then preferably has the features described above for the coupling element 20A.

Individual aspects and features of the different embodiments can be realized and can be advantageous individually and in any combination.

LIST OF REFERENCE SIGNS

1 Dispensing Apparatus
2 Valve Arrangement
3 Container
3A Opening
3B Neck Region
3C Edge
4 Valve
5 Valve Housing
5A Shoulder
5B Internal Space
5C Channel
6 Valve Element
6A Channel
7 Reset Element
8 Valve Plate
9 Receptacle
9A Aperture
10 Seal
11 Fixing Part
12 Rising Line
13 Coupling Portion (Fixing Part)
14 Recess
15 15 Welding Region
16 Receiving Space
16A (Wall) Portion 16B (Wall) Portion
17 Coupling Device
17A Coupling Element (Valve Plate)
18 Annular Space
19 Collar
20 Coupling Portion (Container)
20A Coupling Element (Container)
21 End Wall
22 Aperture
23 Stop
24 24 First Portion
25 Second Portion
26 Weld Seam
27 Tool/Holder
28 Tool/Holder
29 29 Weld Area
E Extension
F Fluid
G Propellant Gas
L Axis

The invention claimed is:

1. A method for producing a valve arrangement with a valve housing, a valve plate and a fixing part, the fixing part having a first portion and a second portion projecting radially from the first portion, the first portion being cylindrical or conical and the second portion being flange-like or collar-like, the method comprising,
   inserting the valve housing into a receiving space of the valve plate,
   inserting the first portion of the fixing part into the receiving space of the valve plate such that the valve housing is clamped between the valve plate and the fixing part, and
   laser-welding or ultrasonically welding the second portion of the fixing part with an underside of the valve plate.

2. The method according to claim 1, wherein at least one of the valve plate, the fixing part, the valve housing, a valve element of the valve arrangement or a reset element of the valve arrangement are produced to consist of plastic.

3. The method according to claim 1, further comprising pre-assembling the valve housing with a valve element and a seal in a form-fitting manner to form a valve.

4. The method according to claim 1, wherein the fixing part is axially welded with the valve plate.

5. The method according to claim 1, further comprising welding a welding region of the fixing part with a triangular or rectangular cross-section with the valve plate.

6. The method according to claim 1, wherein the valve plate is made of at least one of a dark or laser-absorbing material and the fixing part is made of a transparent material.

7. A method for producing a dispensing apparatus with a valve arrangement and a container, wherein a valve plate of the valve arrangement is fixed to the container, comprising,
   coupling a tool or holder with a coupling device of the valve plate in a rotationally fixed manner, and
   friction-welding the valve plate with the container so that the valve plate is radially welded with the container and axially flush with the container.

8. The method according to claim 7, wherein at least one of the valve arrangement, the valve plate, or the container are produced to consist of plastic.

9. The method according to claim 7, wherein the container and the valve plate are moved axially relative to each other until the valve plate has reached a defined axial position relative to the container.

10. The method according to claim 7, wherein the valve plate is rotated for friction welding with the container a defined number of revolutions about a common longitudinal axis of the valve plate and the container.

11. The method according to claim 7, wherein the valve plate or the valve arrangement is inserted in a defined rotational position relative to the container.

12. The method according to claim 7, wherein the valve arrangement has a valve housing and a fixing part for fixing the valve housing to the valve plate, wherein the fixing part is laser-welded or ultrasonically welded with the valve plate.

13. The method according to claim 7, wherein the tool or holder at least one of engages in a form-fitting manner in the coupling device or holds the valve plate at coupling elements of the coupling device.

14. The method according to claim 7, wherein the coupling device is formed by or comprises radially extending coupling elements, and the tool or holder couples with the coupling device by engaging between the coupling elements.

15. The method according to claim 14, wherein the radially extending coupling elements separate an annular recess of the valve plate into a plurality of ring segments, the tool or holder engaging into the plurality of ring segments.

16. The method according to claim 7, wherein the container is held in a rotationally fixed manner.

17. The method according to claim 7, further comprising coupling another tool or another holder with a coupling portion of the container in a rotationally fixed manner.

18. A method for producing a dispensing apparatus with a valve arrangement and a container, wherein a valve plate of the valve arrangement is fixed to the container, the valve plate having a coupling device formed by or comprising radially extending coupling elements, the method comprising,
   coupling a tool or holder with the coupling device in a rotationally fixed manner, the tool or holder engaging between the radially extending coupling elements, and
   friction-welding the valve plate with the container.

19. The method according to claim 18, wherein the valve plate is radially welded with the container.

20. The method according to claim 18, wherein the valve plate is welded with the container such that it is axially flush with the container.

21. The method according to claim 18, wherein the radially extending coupling elements separate an annular recess of the valve plate into a plurality of ring segments, the tool or holder engaging into the plurality of ring segments.

22. The method according to claim 18, wherein at least one of the valve arrangement, the valve plate, or the container are produced to consist of plastic.

23. The method according to claim 18, wherein the container and the valve plate are moved axially relative to each other until the valve plate has reached a defined axial position relative to the container.

24. The method according to claim 18, wherein the valve plate is rotated for friction welding with the container a defined number of revolutions about a common longitudinal axis of the valve plate and the container.

25. The method according to claim 18, wherein the valve plate or the valve arrangement is inserted in a defined rotational position relative to the container.

26. The method according to claim 18, wherein the valve arrangement has a valve housing and a fixing part for fixing the valve housing to the valve plate, wherein the fixing part is laser-welded or ultrasonically welded with the valve plate.

27. The method according to claim 18, wherein the container is held in a rotationally fixed manner.

28. The method according to claim 18, further comprising coupling another tool or another holder with a coupling portion of the container in a rotationally fixed manner.

* * * * *